United States Patent

Caroseli et al.

[11] Patent Number: 5,516,601
[45] Date of Patent: May 14, 1996

[54] CORROSION COLLECTOR FOR BATTERIES

[76] Inventors: Dan Caroseli, P.O. Box 2, Honomu, Hi. 96728; Israel Wells, P.O. Box 143, Ninole, Hi. 96733; Diane B. Truehill, P.O. Box 2, Honomu, Hi. 96728

[21] Appl. No.: 374,083

[22] Filed: Jan. 18, 1995

[51] Int. Cl.⁶ .................................................. H01M 2/32
[52] U.S. Cl. ..................... 429/65; 428/457; 174/117 A; 204/404; 204/434
[58] Field of Search ............................. 429/65; 428/457; 174/117 A, 126.1, 126.3; 204/404, 153.11, 434

[56] References Cited

U.S. PATENT DOCUMENTS 2,621,222  12/1952  Wirth .
3,253,964   5/1966  Douglass ............................ 429/65

FOREIGN PATENT DOCUMENTS 639484  4/1962  Canada .

*Primary Examiner*—M. Nuzzolillo
*Attorney, Agent, or Firm*—Michael I. Kroll

[57] ABSTRACT

A thin, flexible rectangular sheet of copper for attracting corrosion from ambient corrosive atmosphere is disclosed. One side of the copper sheet is covered by an adhesive that, in turn, is overlaid by a peel off protective strip to be removed when it is desired to affix the unit to a battery casing. The shorter edges of the rectangular sheet have cutout areas to incorporate the terminals, thus exposing more surface area of the device to the corrosive atmosphere.

1 Claim, 1 Drawing Sheet

U.S. Patent    May 14, 1996    5,516,601
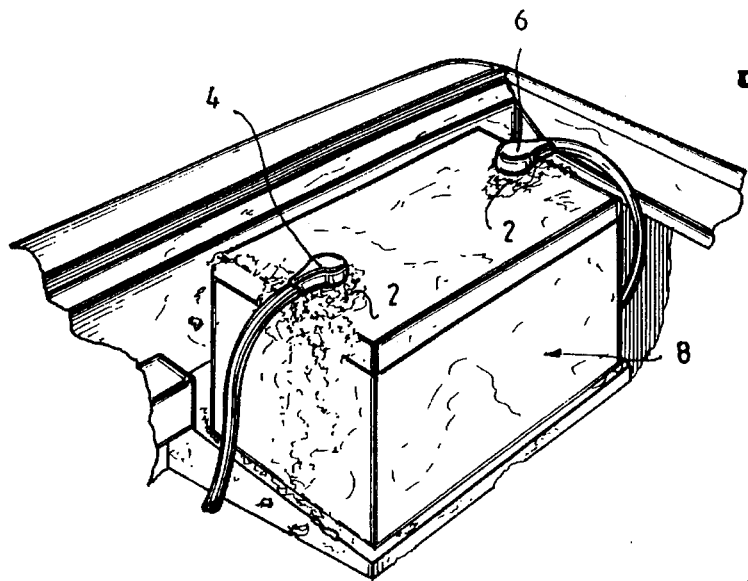
Fig. 1
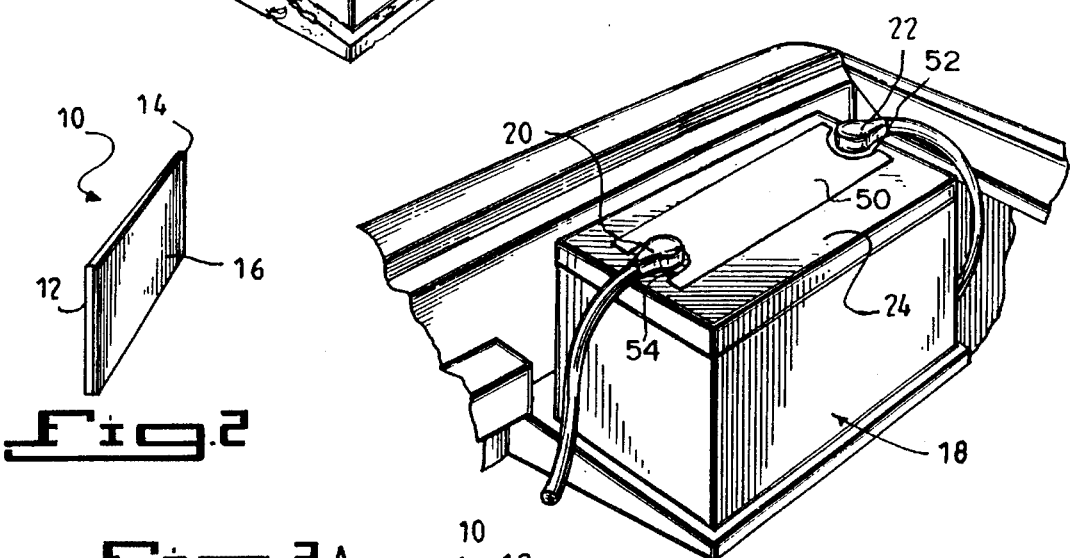
Fig. 3
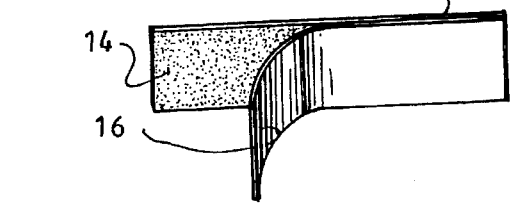
Fig. 2
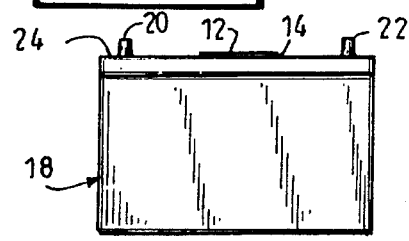
Fig. 2A
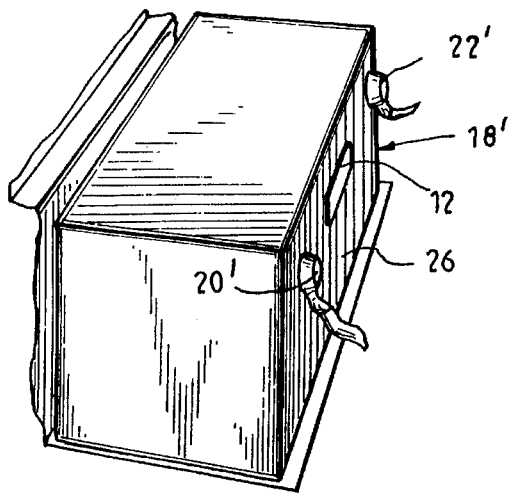
Fig. 4
Fig. 5

CORROSION COLLECTOR FOR BATTERIES

CROSS REFERENCE TO RELATED APPLICATION

This application is related to application Ser. No. 07/884,342, now abandoned.

BACKGROUND OF THE INVENTION

1. Field of the Invention

The present invention relates to automotive batteries. More specifically, it relates to a device to be attached to the battery to attract corrosion. Even more specifically, it relates to a thin, flexible copper strip having an adhesive backing that allows the user to easily place the device on the battery.

Thus it can be seen that the potential fields of use for this invention are myriad and the particular preferred embodiment described herein is in no way meant to limit the use of the invention to the particular field chosen for exposition of the details of the invention.

A comprehensive listing of all the possible fields to which this invention may be applied is limited only by the imagination and is therefore not provided herein. Some of the more obvious applications are mentioned herein in the interest of providing a full and complete disclosure of the unique properties of this previously unknown general purpose article of manufacture. It is to be understood from the outset that the scope of this invention is not limited to these fields or to the specific examples of potential uses presented hereinafter.

2. Description of the Prior Art

In many cases the terminals of a battery can become corroded because of the corrosive atmosphere in which the battery operates. The present invention addresses this problem by providing a thin, flexible sheet of copper with an adhesive backing on one side to react with the corrosive gasses in the atmosphere. This is similar to the old trick of placing a penny on the battery to present a more reactive surface to the corrosive agents than the terminals.

Following hereinafter is a discussion of prior art patents that are related to the present invention:

In U.S. Pat. No. 2,621,222 issued to George S. Wirth on Dec. 9, 1952 there is disclosed a battery terminal connector wherein a removable biased cover plate made of a non-conducting material is provided. In contrast to the present invention, there is no thin, flexible sheet of copper disclosed having an adhesive side provided with a peel off strip to allow the user to attach the strip wherever desired on the surface of the battery.

Canadian patent No. 639,484 issued on Apr. 30, 1962 to Barney M. Giles discloses a corrosion collector for batteries. This is unlike the present invention in that the Giles patent shows a corrosion collection bar having a square cross section instead of the thin strip of the instant invention. Additionally, the attachment means in the Giles patent are represented as staples driven into the body of the battery covering.

Lastly, U.S. Pat. No. 3,253,964 issued on May 31, 1966 to Albert T. Douglas discloses a corrosion inhibitor for storage batteries. As in the Canadian patent to Giles, above, there is no teaching of an adhesive means, nor is there any showing of the peel off strip covering an adhesive surface for easier packaging and use.

As will be seen, the simplicity and effectiveness of my invention is not rivaled in the prior art.

None of the above inventions and patents, taken either singly or in combination, is seen to describe the instant invention as claimed.

SUMMARY OF THE INVENTION

Briefly, the invention comprises a thin, flexible rectangular sheet of copper. One side of the copper sheet is covered by an adhesive that, in turn, is overlaid by a peel off protective strip to be removed when it is desired to affix the unit to a battery casing. In an alternative embodiment, the shorter edges of the rectangular sheet have cutout areas to incorporate the terminals, thus exposing more surface area of the device to the corrosive atmosphere.

Accordingly, it is a principal object of the invention to provide a new and improved corrosion collector for batteries which overcomes the disadvantages of the prior art in a simple but effective manner.

It is a major object of this invention to provide a corrosion collector for batteries wherein the device is a thin flexible rectangular strip for ease in packaging and distribution.

It is another object of the invention to provide an adhesive means on one side of the strip to allow the user to attach the strip on any portion of the battery casing that they wish, including those batteries wherein the terminals extend outwards from a side of the battery.

It is another object of the invention to provide a protective peel off cover for the adhesive surface on the strip to allow the user to expose the adhesive area immediately prior to attaching the strip, thus assuring a lasting bond.

Finally, it is a general goal of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

The present invention meets or exceeds all the above objects and goals. Upon further study of the specification and appended claims, further objects and advantages of this invention will become apparent to those skilled in the art.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein:

FIG. 1 is an environmental perspective view of a battery with corroding terminals.

FIG. 2 is a perspective view of the instant invention.

FIG. 2A is a view of the instant invention showing the peel off protective layer.

FIG. 3 is an environmental perspective view of a battery with a second embodiment of the instant invention installed thereon.

FIG. 4 is a front view of the instant invention mounted on the battery.

FIG. 5 is a view of the invention mounted on a battery of the type where the battery terminals extend outwardly from the side of the battery casing.

DETAILED DESCRIPTION OF THE PREFERRED EMBODIMENTS

The first embodiment of the instant invention is generally indicated at 10 in FIGS. 2 and 2A. The device 10 is made up of a rectangular strip 12, preferably made of copper or of copper coated zinc. One side of the strip 12 has an adhesive 14 located thereon. Lying over the adhesive is a protective peel off strip layer 16, shown partially removed in FIG. 2A. The protective layer serves to prevent the adhesive from being soiled or otherwise contaminated until the device 10 is to be attached to a battery 8 (shown in FIG. 1). In regards to FIG. 1, this is a showing of what happens to battery terminals when exposed to an ambient corrosive atmosphere. The terminals 4, 6 are corroded, and the corrosion 2 is threatening the battery casing and the metal portions of the battery mounting.

Referring now to FIG. 3, a second embodiment of the invention is shown. In this embodiment, the strip 50 is substantially rectangular in shape, however the short edges of the strip 50 have cutout portions 52 and 54 to allow the terminals 20, 22 to extend upwardly therethrough. This embodiment allows for more reactive surface area.

Turning to FIG. 5, there is shown a type of battery 26 where the terminals 20' and 22' extend out from the side. The present invention is shown attached between the terminals.

It is to be understood that the provided illustrative examples are by no means exhaustive of the many possible uses for my invention.

From the foregoing description, one skilled in the art can easily ascertain the essential characteristics of this invention and, without departing from the spirit and scope thereof, can make various changes and modifications of the invention to adapt it to various usages and conditions.

It is to be understood that the present invention is not limited to the sole embodiment described above, but encompasses any and all embodiments within the scope of the following claims:

I claim:

1. A device for eliminating corrosion in combination with an automotive battery comprising:

an extended rectangular metal strip having a copper surface on one side for placement between battery terminals and on an outside surface of the battery with long sides of said rectangle aligned with a line between the battery terminals, with short ends of said strip having cutout portions permitting said strip to surround three sides of each of said terminals when mounted on said battery;

an adhesive layer on a surface of said metal strip opposite from that of the copper surface for affixing said metal strip to said outside surface of the battery; and a peel-off cover for protecting said adhesive layer prior to affixing said metal strip to said battery, said peel-off cover being removable to expose said adhesive layer when it is desired to affix said copper strip to the battery.

* * * * *